(12) United States Patent
Fuke et al.

(10) Patent No.: US 11,820,325 B2
(45) Date of Patent: Nov. 21, 2023

(54) VEHICLE, INFORMATION PROCESSING DEVICE, INFORMATION PROCESSING METHOD, AND RECORDING MEDIUM STORING PROGRAM

(71) Applicant: TOYOTA JIDOSHA KABUSHIKI KAISHA, Toyota (JP)

(72) Inventors: Jumpei Fuke, Toyota (JP); Kuniharu Tsuzuki, Handa (JP); Shimpei Asai, Okazaki (JP); Nobuyoshi Nagai, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/819,760

(22) Filed: Aug. 15, 2022

(65) Prior Publication Data

US 2023/0101462 A1   Mar. 30, 2023

(30) Foreign Application Priority Data

Sep. 28, 2021  (JP) ................. 2021-158415

(51) Int. Cl.
  *B60R 25/10* (2013.01)
  *B60R 25/24* (2013.01)
  *B60R 25/01* (2013.01)
  *G07C 9/00* (2020.01)

(52) U.S. Cl.
  CPC .......... *B60R 25/1003* (2013.01); *B60R 25/01* (2013.01); *B60R 25/24* (2013.01); *G07C 9/00309* (2013.01); *B60R 2325/101* (2013.01); *B60R 2325/205* (2013.01); *G07C 2009/00769* (2013.01); *G07C 2209/08* (2013.01); *G07C 2209/63* (2013.01)

(58) Field of Classification Search
  None
  See application file for complete search history.

(56) References Cited

U.S. PATENT DOCUMENTS

| 3,548,373 | A  | * | 12/1970 | Rivera ............... B60R 25/1001 70/241 |
| 9,738,125 | B1 | * | 8/2017 | Brickley ................ B60D 1/62 |
| 10,607,425 | B2 | * | 3/2020 | Kwak ................ G07C 5/0808 |
| 11,295,586 | B2 | * | 4/2022 | Jonsson ............... G08B 13/06 |

(Continued)

FOREIGN PATENT DOCUMENTS

JP    2016-56614 A    4/2016

*Primary Examiner* — Carlos Garcia
(74) *Attorney, Agent, or Firm* — Oblon, McClelland, Maier & Neustadt, L.L.P.

(57) ABSTRACT

A vehicle includes a confirmation section that confirms, at a time of vehicle door locking, whether or not an information processing device configured to be used to perform the vehicle door locking, is inside the vehicle; a determination section that, in a case in which it has not been confirmed by the confirmation section that the information processing device is inside the vehicle, determines whether or not vibration or movement of the information processing device has been detected within a predetermined period of time from the door locking; and an actuation section that, in a case in which vibration or movement of the information processing device has not been detected by the determination section, actuates an alarm.

10 Claims, 14 Drawing Sheets

(56) References Cited

U.S. PATENT DOCUMENTS

| | | | |
|---|---|---|---|
| 2005/0184586 A1* | 8/2005 | Cheng | B60R 25/24 |
| | | | 307/10.2 |
| 2017/0298659 A1* | 10/2017 | Watanabe | G07C 9/00309 |
| 2019/0359018 A1* | 11/2019 | Brickley | B60W 50/0098 |
| 2020/0175778 A1* | 6/2020 | Ziegler | G06Q 10/06 |
| 2022/0410709 A1* | 12/2022 | Florentz | B60K 35/00 |

* cited by examiner

VEHICLE, INFORMATION PROCESSING DEVICE, INFORMATION PROCESSING METHOD, AND RECORDING MEDIUM STORING PROGRAM

CROSS-REFERENCE TO RELATED APPLICATION

This application is based on and claims priority under 35 USC 119 from Japanese Patent Application No. 2021-158415 filed on Sep. 28, 2021, the disclosure of which is incorporated by reference herein.

BACKGROUND

Technical Field

The present disclosure relates to a vehicle, an information processing device, an information processing method, and a program.

Background of the Invention

Japanese Patent Application Laid-Open No. 2016-56614 discloses an electronic key system capable of preventing an electronic key from being trapped inside a vehicle when a vehicle door is locked. In this electronic key system, vehicle-side receiving means of the onboard unit receive an unlocking signal transmitted by an electronic key based on a determination that the electronic key is inside the vehicle when a predetermined operation to instruct locking of the vehicle doors has been performed, and door locking control means unlock the doors based on receipt of the unlocking signal.

In a case in which an information processing device used for performing door locking is left inside the vehicle, actuating an alarm to make a user aware that the information processing device has been left behind is considered.

Even in a case in which an information processing device used for performing door locking is left inside the vehicle, there is a possibility of erroneous detection that the information processing device is not present in the vehicle. In a case in which this kind of erroneous detection has occurred, although the information processing device is actually left inside the vehicle, since an alarm is not actuated, it is conceivable that the user will not notice their misplacement of the information processing device.

SUMMARY

In consideration of the above-described circumstances, the present disclosure aims to make a user aware of misplacement of an information processing device even in cases in which it has not been confirmed that an information processing device configured to be used for performing vehicle door locking is present inside the vehicle.

A first aspect is a vehicle, including: a confirmation section that confirms, at a time of vehicle door locking, whether or not an information processing device configured to be used to perform the vehicle door locking, is inside the vehicle; a determination section that, in a case in which it has not been confirmed by the confirmation section that the information processing device is inside the vehicle, determines whether or not vibration or movement of the information processing device has been detected within a predetermined period of time from the vehicle door locking; and an actuation section that, in a case in which vibration or movement of the information processing device has not been detected by the determination section, actuates an alarm.

In the vehicle of the first aspect, at a time of vehicle door locking, the confirmation section confirms whether or not an information processing device configured to be used to perform the vehicle door locking is present inside the vehicle. In a case in which the confirmation section has not confirmed that the information processing device is inside the vehicle, the determination section determines whether or not vibration or movement of the information processing device has been detected within a predetermined period of time after the vehicle door locking. In a case in which the determination section has not detected vibration or movement of the information processing device, the operation section actuates the alarm. Here, an "information processing device configured to be used for performing vehicle door locking" refers to an information processing device at which a digital key is registered, the information processing device being capable of performing vehicle door locking by an operation performed relative to the information processing device. According to this vehicle, even in a case in which it was not possible to confirm that an information processing device configured to be used for performing vehicle door locking is inside the vehicle, it is possible to make a user aware of the misplacement of the information processing device.

A vehicle of a second aspect is the vehicle of the first aspect, in which the determination section detects movement of the information processing device based on a change in intensity of a radio wave emitted to the vehicle from the information processing device.

The vehicle of the second aspect detects movement of the information processing device based on a change in intensity of a radio wave emitted to the vehicle from the information processing device. Here, the "intensity of a radio wave emitted to the vehicle from the information processing device" refers to the strength of radio waves transmitted during communication between the information processing device and the vehicle. According to this vehicle, utilizing the intensity of radio waves emitted from the information processing device to the vehicle, movement of the information processing device can be detected.

A vehicle of a third aspect is the vehicle of the first or second aspect, in which the confirmation section determines whether or not the information processing device is inside the vehicle at a time of the vehicle door locking by an operation in which a user holding a physical key, which is used to perform the vehicle door locking, contacts a door knob.

The vehicle of the third aspect determines whether or not the information processing device is inside the vehicle at a time of the vehicle door locking by an operation in which a user holding a physical key, which is used to perform the vehicle door locking, contacts a door knob. Here, "a physical key, which is used to perform the vehicle door locking" refers to a key that enables vehicle door locking to be performed by an operation performed relative to the key. According to this vehicle, in regard to a vehicle door locking operation with which there is a possibility of misplacement of the information processing device occurring, it is possible to make a user aware of misplacement of the information processing device.

An information processing device of a fourth aspect is an information processing device configured to be used for performing vehicle door locking, the information processing device including: a confirmation section that confirms, at a time of the vehicle door locking, whether or not the information processing device is inside the vehicle; a determination section that, in a case in which it has not been confirmed by the confirmation section that the information processing device is inside the vehicle, determines whether or not vibration or movement of the information processing device has been detected within a predetermined period of time from the vehicle door locking; and an actuation section that, in a case in which vibration or movement of the information processing device has not been detected by the determination section, actuates an alarm.

In the information processing device of the fourth aspect, a confirmation section confirms, at a time of the vehicle door locking, whether or not the information processing device is inside the vehicle. In a case in which the confirmation section has not confirmed that the information processing device is inside the vehicle, the determination section determines whether or not vibration or movement of the information processing device has been detected within a predetermined period of time after the vehicle door locking. In a case in which the determination section has not detected vibration or movement of the information processing device, the operation section actuates the alarm. According to this information processing device, even in a case in which it was not possible to confirm that an information processing device configured to be used for performing vehicle door locking is inside the vehicle, it is possible to make a user aware of misplacement of the information processing device.

An information processing device of a fifth aspect is the information processing device of the fourth aspect, in which the actuation section causes the vehicle to actuate the alarm. According to this information processing device, it is easier for the user to notice misplacement of the information processing device.

An information processing device of a sixth aspect is the information processing device of the fourth or fifth aspect, in which the confirmation section determines whether or not the information processing device is inside the vehicle at a time of the vehicle door locking by an operation in which a user holding a physical key, which is used to perform the vehicle door locking, contacts a door knob. According to this information processing device, in regard to a vehicle door locking operation with which there is a possibility of misplacement of the information processing device occurring, it is possible to make a user aware of misplacement of the information processing device.

A seventh aspect is an information processing method, including: by a confirmation section, confirming, at a time of vehicle door locking, whether or not an information processing device configured to be used to perform the vehicle door locking, is inside the vehicle; by a determination section, in a case in which it has not been confirmed by the confirmation section that the information processing device is inside the vehicle, determining whether or not vibration or movement of the information processing device has been detected within a predetermined period of time from the vehicle door locking; and, by an actuation section, in a case in which vibration or movement of the information processing device has not been detected by the determination section, actuating an alarm.

In the information processing method of the seventh aspect, at a time of vehicle door locking, the confirmation section confirms whether or not an information processing device configured to be used to perform the vehicle door locking is present inside the vehicle. In a case in which the confirmation section has not confirmed that the information processing device is inside the vehicle, the determination section determines whether or not vibration or movement of the information processing device has been detected within a predetermined period of time after the vehicle door locking. In a case in which the determination section has not detected vibration or movement of the information processing device, the operation section actuates the alarm. According to this information processing method, even in a case in which it was not possible to confirm that an information processing device configured to be used for performing vehicle door locking is inside the vehicle, it is possible to make a user aware of misplacement of the information processing device.

An eighth aspect is an information processing method in an information processing device configured to be used for performing vehicle door locking, the method including: by a confirmation section, confirming, at a time of the vehicle door locking, whether or not the information processing device is inside the vehicle; by a determination section, in a case in which it has not been confirmed by the confirmation section that the information processing device is inside the vehicle, determining whether or not vibration or movement of the information processing device has been detected within a predetermined period of time from the vehicle door locking; and by an actuation section, in a case in which vibration or movement of the information processing device has not been detected by the determination section, actuating an alarm.

In the information processing method of the eighth aspect, a confirmation section confirms, at a time of the vehicle door locking, whether or not the information processing device is inside the vehicle, in a case in which the confirmation section has not confirmed that the information processing device is inside the vehicle, a determination section determines whether or not vibration or movement of the information processing device has been detected within a predetermined period of time after the vehicle door locking, and in a case in which vibration or movement of the information processing device has not been detected by the determination section, an actuation section actuates an alarm. According to this information processing method, even in a case in which it was not possible to confirm that an information processing device configured to be used for performing vehicle door locking is inside the vehicle, it is possible to make a user aware of misplacement of the information processing device.

A ninth aspect is a non-transitory recording medium storing a program that is executable by a computer to perform processing, the processing including: confirming, at a time of vehicle door locking, whether or not an information processing device configured to be used to perform the vehicle door locking, is inside the vehicle; in a case in which it has not been confirmed that the information processing device is inside the vehicle, determining whether or not vibration or movement of the information processing device has been detected within a predetermined period of time from the vehicle door locking; and in a case in which vibration or movement of the information processing device has not been detected, actuating an alarm.

According to the program stored on the non-transitory recording medium of the ninth aspect, a computer, at a time of vehicle door locking, confirms whether or not an information processing device, which is used to perform the vehicle door locking, is inside the vehicle, in a case in which it has not been confirmed that the information processing device is inside the vehicle, determines whether or not vibration or movement of the information processing device has been detected within a predetermined period of time after the vehicle door locking, and in a case in which vibration or movement of the information processing device has not been detected, actuates an alarm. According to this program, even in a case in which it was not possible to confirm that an information processing device configured to be used for performing vehicle door locking is inside the vehicle, it is possible to make a user aware of misplacement of the information processing device.

A tenth aspect is a non-transitory recording medium storing a program that is executable by a computer to perform processing, the computer being provided at an information processing device configured to be used for performing vehicle door locking, the processing comprising: confirming, at a time of the vehicle door locking, whether or not the information processing device is inside the vehicle; in a case in which it has not been confirmed that the information processing device is inside the vehicle, determining whether or not vibration or movement of the information processing device has been detected within a predetermined period of time from the vehicle door locking; and in a case in which vibration or movement of the information processing device has not been detected, actuating an alarm.

According to the program stored on the non-transitory recording medium of the tenth aspect, a computer, at a time of vehicle door locking, confirms whether or not an information processing device is inside the vehicle, in a case in which it has not been confirmed that the information processing device is inside the vehicle, determines whether or not vibration or movement of the information processing device has been detected within a predetermined period of time after the vehicle door locking, and in a case in which no vibration or movement of the information processing device has been detected, actuates an alarm. According to this program, even in a case in which it was not possible to confirm that an information processing device configured to be used for performing vehicle door locking is inside the vehicle, it is possible to make a user aware of misplacement of the information processing device.

Effect of the Invention

According to the present disclosure, even in a case in which it was not possible to confirm that an information processing device configured to be used for performing vehicle door locking is inside the vehicle, it is possible to make a user aware of misplacement of the information processing device.

BRIEF DESCRIPTION OF THE DRAWINGS

Exemplary embodiments of the present disclosure will be described in detail based on the following figures, wherein.

DETAILED DESCRIPTION

Explanation follows regarding a vehicle system according to an exemplary embodiment of the present disclosure, with reference to FIGS. 1 to 14.

First Exemplary Embodiment

Figure 1:
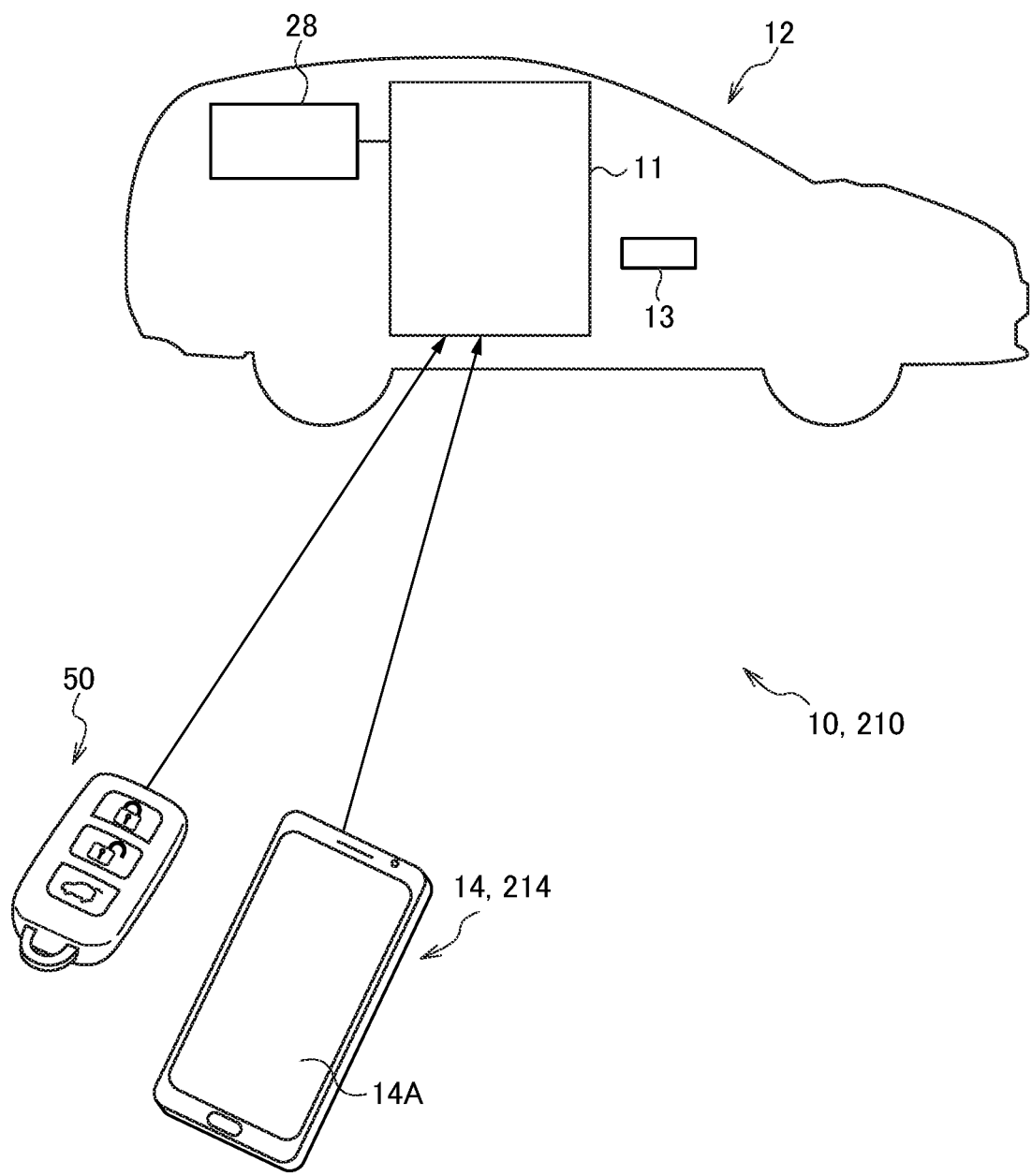
FIG. 1 is a diagram illustrating a schematic configuration of a vehicle system according to first and second exemplary embodiments.

FIG. 1 is a block diagram illustrating a schematic configuration of a vehicle system 10 according to a first exemplary embodiment.

Overall Configuration

As illustrated in FIG. 1, the vehicle system 10 according to the present exemplary embodiment includes a vehicle 12, and a smartphone 14 as an information processing device for controlling the vehicle 12. The vehicle system 10 further includes a physical key 50 that is a portable device for exclusive use only with the vehicle 12, for controlling the vehicle 12.

The vehicle 12 is configured to be capable of directly receiving local communication from the smartphone 14 and the physical key 50 without the use of a network. This communication includes wireless communication and infrared communication.

A door locking device 28 performs locking and unlocking of a driver's seat door, a passenger's seat door, a rear door, and a backdoor. Locking and unlocking of the respective doors by the door locking device 28 is enabled by an operation of contacting a door knob 13, an operation with respect to the physical key 50, and an operation with respect to the smartphone 14, by a user holding the physical key 50.

Figure 2:
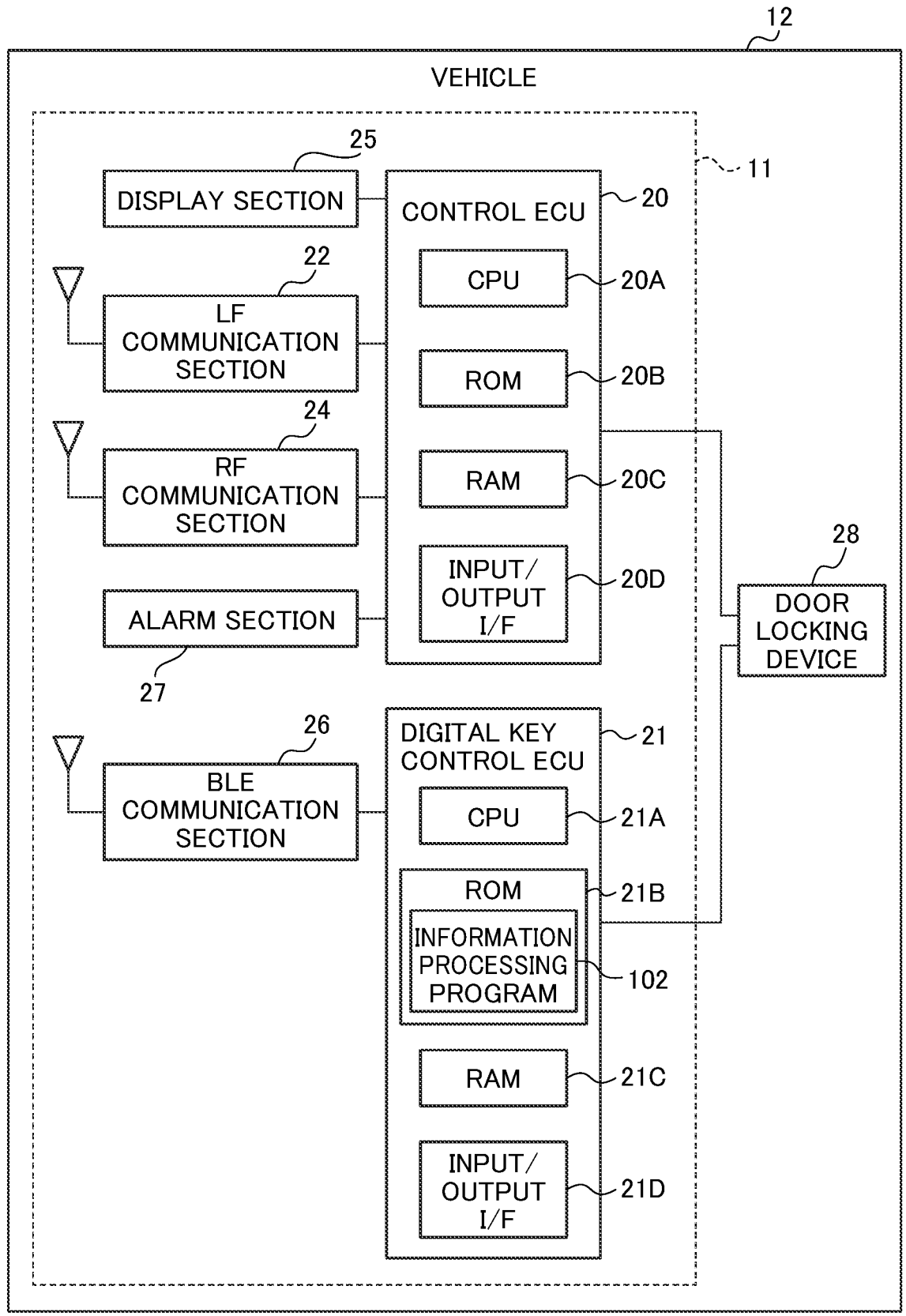
FIG. 2 is a block diagram illustrating a hardware configuration of a vehicle according to the first exemplary embodiment.

As illustrated in FIG. 2, an onboard unit 11 installed in the vehicle 12 includes a control electronic control unit (ECU) 20, a digital key control ECU 21, a low frequency (LF)

communication section 22, a radio frequency (RF) communication section 24, a display section 25, a Bluetooth (registered trademark) low energy (BLE) communication section 26, and an alarm section 27.

The LF communication section 22 is a communication unit that performs LF band wireless communication, and transmits a request signal toward the physical key 50. The LF communication section 22 of the present exemplary embodiment is installed with respect to the driver's seat door, the passenger's seat door, the rear door, and the back door.

The RF communication section 24 is a communication unit that performs RF band wireless communication, and receives a response signal from the physical key 50.

The BLE communication section 26 is a communication unit that performs wireless communication using Bluetooth (registered trademark), and performs communication with a BLE communication section 14C, which is described below.

The display section 25 is, for example, a liquid crystal monitor provided at an instrument panel, a meter panel, or the like to display images relating to a current position, a travel path, and advisory information.

The alarm section 27 is, for example, a speaker, and is provided at an instrument panel, a center console, a front pillar, a dashboard, or the like.

The control ECU 20 includes a central processing unit (CPU) 20A, read only memory (ROM) 20B, random access memory (RAM) 20C, and an input/output interface (I/F) 20D. The CPU 20A, the ROM 20B, the RAM 20C, and the input/output I/F 20D are connected so as to be capable of communicating with each other via an internal bus (not shown).

The CPU 20A is a central processing unit that executes various programs and controls various sections. Namely, the CPU 20A reads a program from the ROM 20B, and executes the program using the RAM 20C as a workspace.

The ROM 20B stores various programs and various data.

The RAM 20C serves as a workspace for temporarily storing programs and data.

The input/output I/F 20D is an interface for communicating with each of the LF communication section 22, the RF communication section 24, the display section 25, the alarm section 27, and the door locking device 28.

The control ECU 20 may include storage serving as a storage section in addition to, or instead of, the ROM 20B. This storage is configured, for example, by a hard disk drive (HDD) or a solid state drive (SSD).

Figure 3:
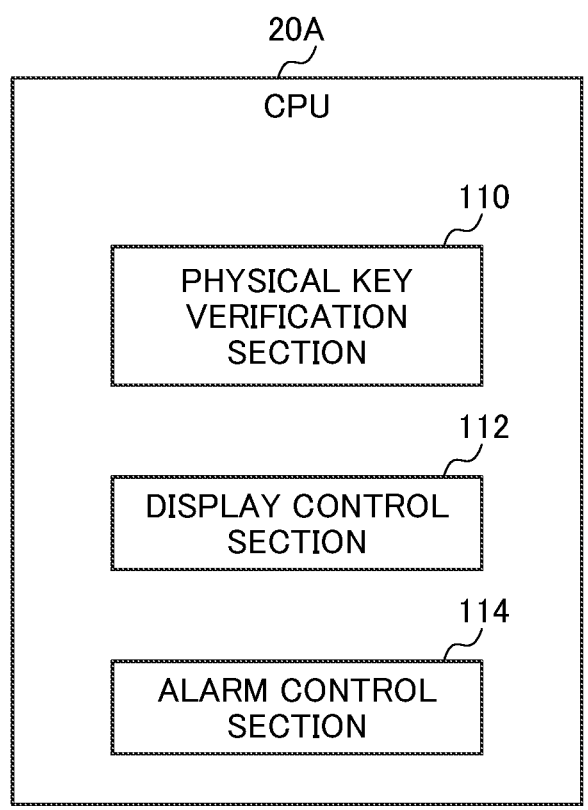
FIG. 3 is a block diagram illustrating an example of a functional configuration of a CPU of a control ECU in an onboard unit of the first exemplary embodiment.

As illustrated in FIG. 3, in the control ECU 20 of the present exemplary embodiment, the CPU 20A functions as a physical key verification section 110, a display control section 112, and an alarm control section 114, by executing a program.

The physical key verification section 110 performs verification processing for the physical key 50 by comparing an ID of the physical key 50 with pre-recorded ID information based on wireless communication with the physical key 50 at the LF communication section 22 and the RF communication section 24. More specifically, in a case in which the LF communication section 22 has transmitted a response request signal to a physical key 50 having the same ID as the pre-recorded ID information and the RF communication section 24 has received a response signal from the physical key 50, the physical key verification section 110 determines that the verification of the physical key 50 has been successful.

In a case in which the physical key 50 has been verified successfully, based on wireless communication with the physical key 50 at the LF communication section 22 and the RF communication section 24, the physical key verification section 110 executes vehicle control including door locking and unlocking by the door locking device 28, turning on the power of the vehicle 12, and engine starting.

The display control section 112 controls display by the display section 25. The alarm control section 114 controls actuation of an alarm by the alarm section 27.

The digital key control ECU 21 includes a CPU 21A, a ROM 21B, a RAM 21C, and an input/output I/F 21D. The CPU 21A, the ROM 21B, the RAM 21C, and the input/output I/F 21D are connected so as to be capable of communicating with each other via an internal bus (not shown). The CPU 23A is an example of a processor, and the RAM 23C is an example of a memory.

The respective functionalities of the CPU 21A, the ROM 21B, the RAM 21C, and the input/output I/F 21D are the same as those of the above-described CPU 20A, the ROM 20B, the RAM 20C, and the input/output I/F 20D.

The ROM 21B of the present exemplary embodiment stores an information processing program 102.

The input/output I/F 21D is an interface for communicating with each of the BLE communication section 26 and the door locking device 28.

The digital key control ECU 21 may include storage serving as a storage section in addition to, or instead of, the ROM 21B. This storage is configured, for example, by an HDD or an SSD.

Compared to a physical key, it is difficult to accurately detect whether or not a smartphone storing a registered digital key is inside a vehicle. This may result in the vehicle doors being locked in a state in which a smartphone storing a registered digital key is inside the vehicle, and there is a possibility of misplacement of the smartphone occurring.

More specifically, the smartphone forms an area using a Bluetooth band (2.4 GHz) radio wave. This radio wave is highly rectilinear, and it is difficult to form an area covering the entire vehicle cabin area inside a vehicle in which there is a large amount of metal.

Moreover, in vehicle control using digital keys, Bluetooth radio waves from smartphones are used, and there is significant variation in radio wave intensity between models, making it difficult to form an area that covers the entire vehicle cabin for all models.

Accordingly, in the present exemplary embodiment, even in cases in which the onboard unit 11 has been unable to confirm that the smartphone 14 storing the registered digital key 140 is inside the vehicle 12, in a case in which vibration of the smartphone 14 has not been detected within a predetermined period of time from locking of the door, the alarm is actuated.

Figure 4:
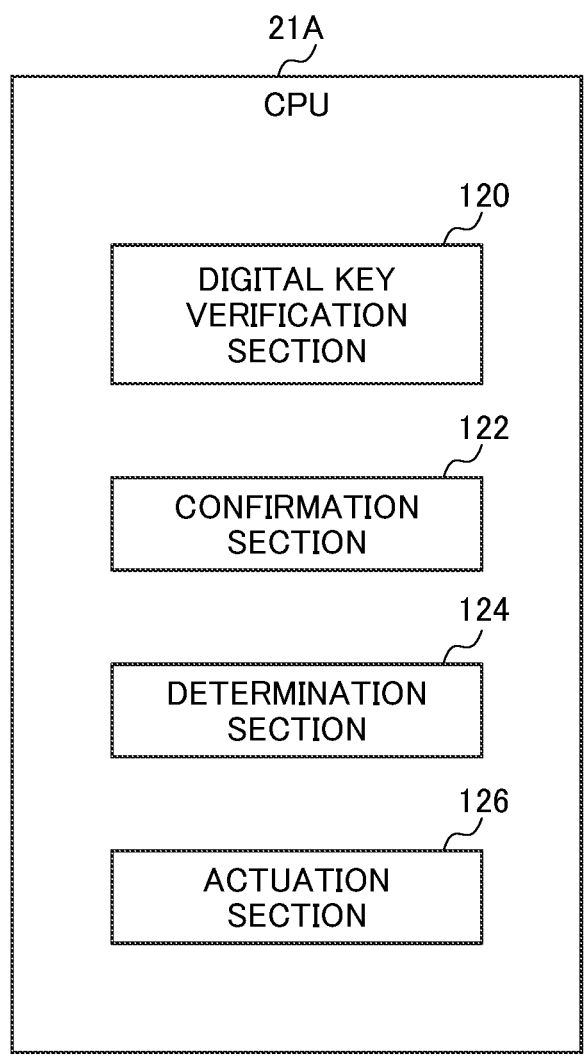
FIG. 4 is a block diagram illustrating an example of a functional configuration of a CPU of a digital key control ECU in an onboard unit of the first exemplary embodiment.

More specifically, as illustrated in FIG. 4, in the digital key control ECU 21 of the present exemplary embodiment, the CPU 21A executes the information processing program 102 to function as a digital key verification section 120, a confirmation section 122, a determination section 124, and an actuation section 126.

The digital key verification section 120 performs authentication processing for the digital key by comparing the ID of the digital key registered in the smartphone 14 with pre-recorded ID information based on wireless communication with the smartphone 14 at the BLE communication section 26. In a case in which authentication of the digital key has been successful, the digital key verification section 120 executes vehicle control including door locking and unlocking by the door locking device 28, turning on the power of the vehicle 12, and starting the engine.

The confirmation section 122 checks whether or not the smartphone 14 is inside the vehicle 12 at a time of door locking of the vehicle 12. More specifically, when a user holding the physical key 50 locks the doors by an operation of contacting the door knob 13, the confirmation section 122 determines whether or not the smartphone 14 is inside the vehicle 12 based on the radio wave strength of Bluetooth radio waves transmitted from the smartphone 14 to the vehicle 12.

In cases in which the confirmation section 122 has not confirmed that the smartphone 14 is inside the vehicle 12, the determination section 124 determines whether or not vibration of the smartphone 14 has been detected within a predetermined period of time from the locking of the door. Specifically, in a case in which the confirmation section 122 has not confirmed that the smartphone 14 is inside the vehicle 12, the determination section 124 determines whether or not vibration of the smartphone 14 has been detected within a predetermined period of time from the locking of the door based on vibration information that is transmitted from the smartphone 14 and that represents vibration of the smartphone 14 within a predetermined period of time from the locking of the door.

In a case in which the determination section 124 has not detected vibration of the smartphone 14, the actuation section 126 actuates an alarm by the alarm section 27. Moreover, in a case in which the confirmation section 122 has confirmed that the smartphone 14 is inside the vehicle 12, the actuation section 126 actuates an alarm by the alarm section 27. For example, the alarm section 27 sounds a buzzer to report that the smartphone 14 has been misplaced.

Physical Key

The physical key 50 is an electronic device that is portable by a user of the vehicle 12. The physical key 50 includes a microcomputer, an LF communication section, and an RF communication section.

The LF communication section is a communication unit that performs LF band wireless communication, and receives a response request signal from the LF communication section 22. The RF communication section is a transmission unit that performs RF band wireless communication, and transmits a response signal to the RF communication section 24.

The microcomputer verifies the ID information included in the response request signal received from the LF communication section 22 against the unique ID of the physical key 50, and in a case in which they match, causes the RF communication section to transmit the response signal. Moreover, when the microcomputer receives a user operation at an operation section (not illustrated) provided at the physical key 50 corresponding to any of door locking and unlocking by the door locking device 28, turning on the power of the vehicle 12, and starting the engine, the RF communication section causes a signal corresponding to the user operation to be transmitted to the RF communication section 24 of the onboard unit 11.

Smartphone

Figure 5:
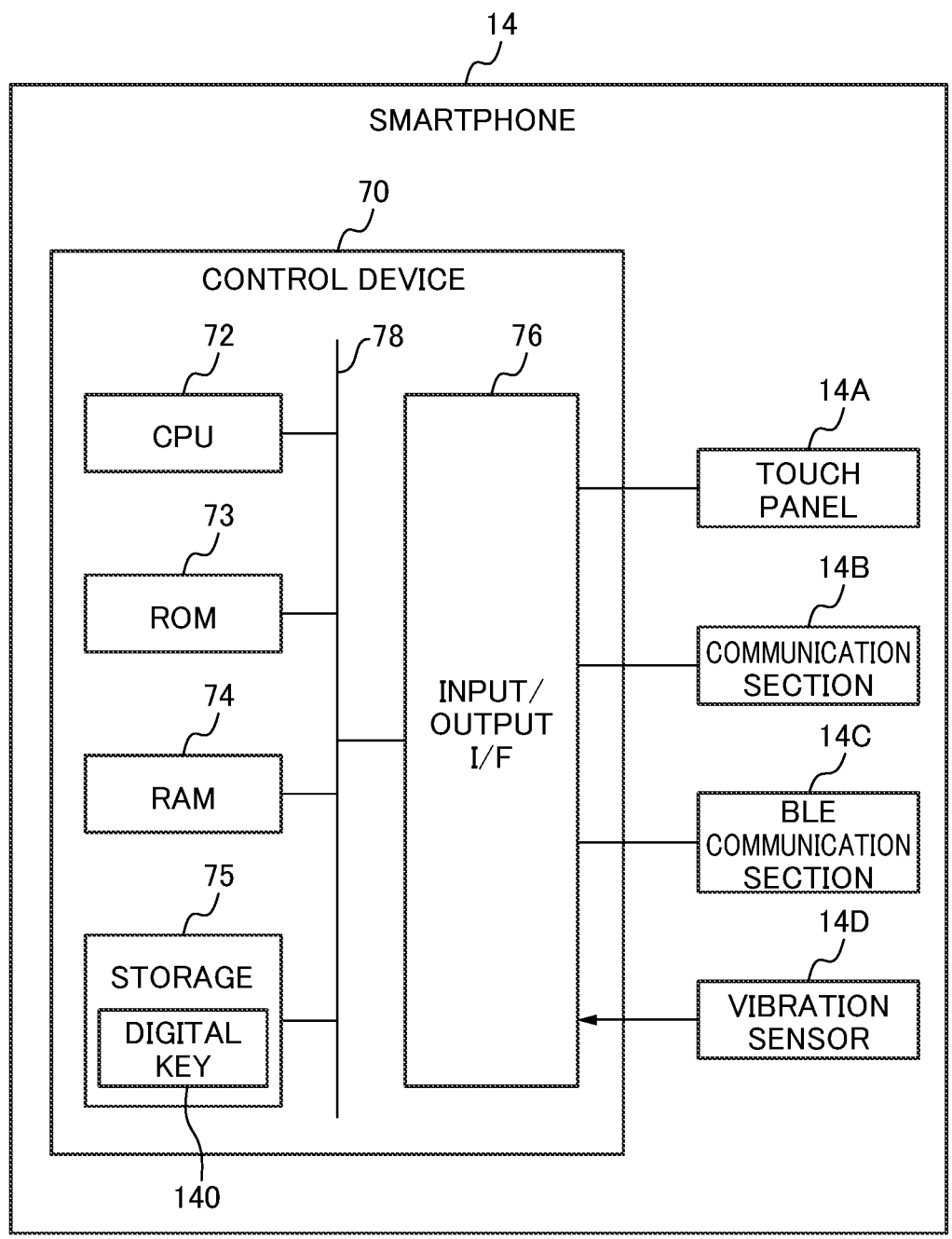
FIG. 5 is a block diagram illustrating a hardware configuration of a smartphone of the first exemplary embodiment.

The smartphone 14 is a communication terminal owned by a user. The smartphone 14 of the present exemplary embodiment, by communication with the onboard unit 11, in a case in which verification of a registered digital key has been successful, is configured to receive a user operation corresponding to any of door locking and unlocking by the door locking device 28, turning on the power of the vehicle 12, and starting the engine, and to enable door locking and unlocking by the door locking device 28, turning on the power of the vehicle 12, and starting the engine. As illustrated in FIG. 5, the smartphone 14 includes a control device 70, a touch panel 14A, a communication section 14B, a BLE communication section 14C, and a vibration sensor 14D.

The control device 70 includes a CPU 72, which is an example of a hardware processor, ROM 73, RAM 74, storage 75, and an input/output I/F 76. The CPU 72, the ROM 73, the RAM 74, the storage 75, and the input/output I/F 76 are connected to each other via a bus 78.

The respective functionalities of the CPU 72, the ROM 73, the RAM 74, and the input/output I/F 76 are the same as those of the above-described CPU 20A, ROM 20B, RAM 20C, and input/output I/F 20D. A micro SD card may be applied as the storage 75 of the present exemplary embodiment, in addition to storage inside the smartphone 14.

The CPU 72 reads a program from the ROM 73, and executes the program using the RAM 74 as a workspace. In the present exemplary embodiment, the digital key 140 is registered at the storage 75. An application program for vehicle control is stored in the ROM 73 in order to perform vehicle control according to a user operation using the digital key 140.

The touch panel 14A, the communication section 14B, the BLE communication section 14C, and the vibration sensor 14D are connected to the control device 70 of the present exemplary embodiment via the input/output I/F 76. Here, the touch panel 14A, the communication section 14B, the BLE communication section 14C, and the vibration sensor 14D may be directly connected to the bus 78.

When the application program for vehicle control is executed, the CPU 72 causes icons to be displayed at the touch panel 14A for each of door locking and unlocking by the door locking device 28, turning on the power of the vehicle 12, and starting the engine. When a user performs an operation with respect to these icons, the BLE communication section 14C transmits a signal to the BLE communication section 26 of the onboard unit 11, the signal instructing vehicle control corresponding to the operated icon (door locking or unlocking by the door locking device 28, turning on the power of the vehicle 12, or starting the engine).

When a user holding the physical key 50 has locked the door by an operation of contacting the door knob 13, and when the BLE communication section 14C receives a locking completion notification from the vehicle 12, the CPU 72 uses the BLE communication section 14C to transmit, to the vehicle 12, vibration information representing an output of the vibration sensor 14D during a predetermined period of time.

Processing Flow

Figure 6:
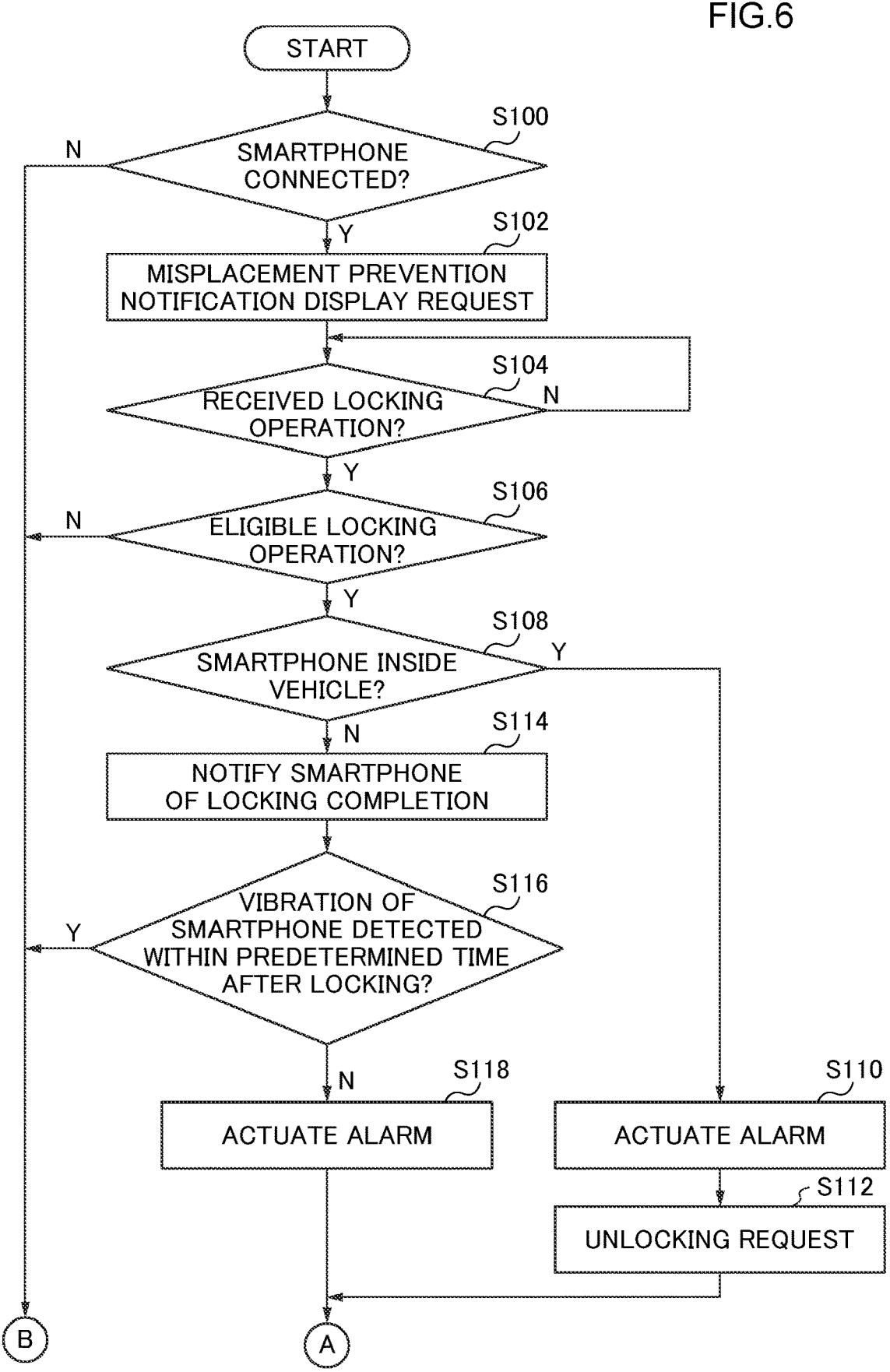
FIG. 6 is a flowchart illustrating an example of a flow of misplacement prevention processing executed by a CPU of a digital key control ECU in an onboard unit of the first exemplary embodiment.
Figure 7:
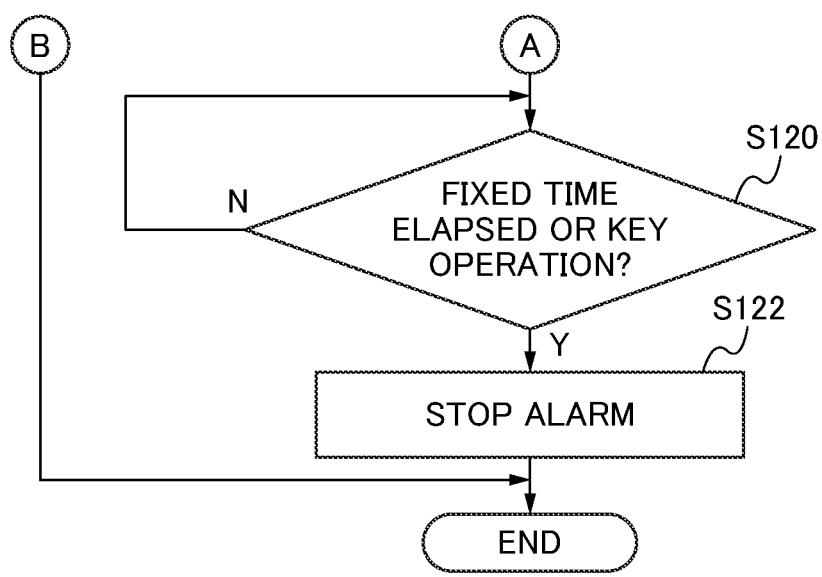
FIG. 7 is a flowchart illustrating an example of a flow of misplacement prevention processing executed by a CPU of a digital key control ECU in an onboard unit of the first exemplary embodiment.
Figure 8:
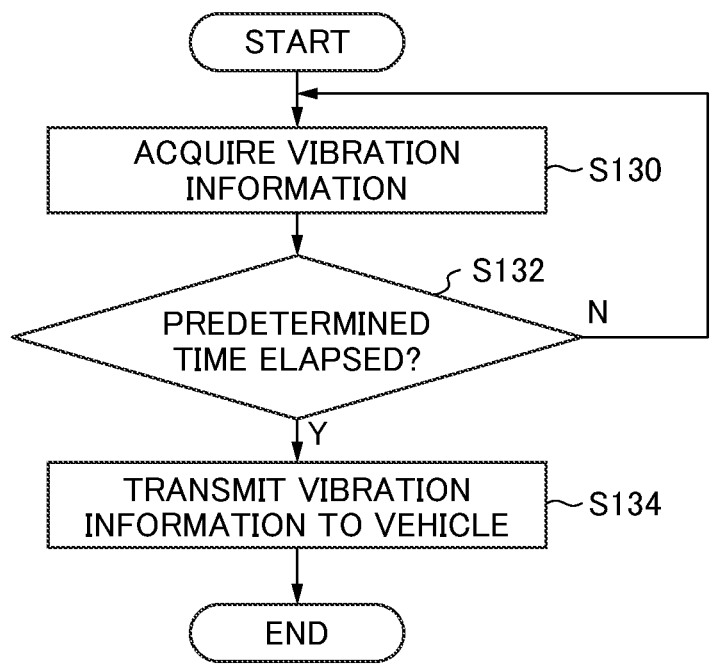
FIG. 8 is a flowchart illustrating an example of a flow of vibration information transmission processing executed by a CPU of a control device in a smartphone of the first exemplary embodiment.

Next, explanation follows regarding a flow of processing in the vehicle system 10 of the present exemplary embodiment, with reference to the flowcharts of FIG. 6 to FIG. 8.

First, when an operation by a user present inside the vehicle 12 to stop the engine is received, the CPU 21A of the digital key control ECU 21 of the onboard unit 11 executes the information processing program 102 to perform the misplacement prevention processing illustrated in FIG. 6 and FIG. 7.

First, at step S100, the CPU 21A determines whether or not the BLE communication section 26 is connected by wireless communication using Bluetooth (registered trademark) to the BLE communication section 14C of the smartphone 14. In a case in which the BLE communication section 26 is not connected to the BLE communication section 14C of the smartphone 14, the CPU 21A ends the misplacement prevention processing. In a case in which the BLE communication section 26 is connected to the BLE communication section 14C of the smartphone 14, the CPU 21A transitions to step S102. Here, in a case in which there is a smartphone 14 that has been connected even only once during travel of the vehicle 12, the processing may proceed to step S102.

In step S102, the CPU 21A requests that the control ECU 20 displays a notification to prevent the user from misplacing the smartphone 14 (leaving the smartphone 14 behind). The control ECU 20 then controls the display section 25 so as to display a notification to prevent the user from leaving the smartphone 14 behind. For example, the message, "take your smartphone with you", is displayed at the display section 25. Here, the smartphone 14 may be requested to display a notification to prevent the user from leaving the smartphone 14 behind, and the above-noted message may be displayed at the touch panel 14A of the smartphone 14. In a case in which the verification with the physical key 50 has been successful, it may not be necessary to display a notification to prevent the smartphone 14 from being left behind.

At step S104, the CPU 21A determines whether or not a door locking operation by a user has been received. For example, when a user leaves the vehicle 12 and a door locking operation by a user operation using the smartphone 14 or the physical key 50 is received, the processing transitions to step S106. Further, the onboard unit 11 locks the respective doors using the door locking device 28.

At step S106, the CPU 21A, functioning as the confirmation section 122, determines whether or not the door locking operation received in step S104 is a door locking operation that qualifies as cause for actuating a misplacement prevention alarm.

Specifically, an operation in which a user holding the physical key 50 contacts the door knob 13 is defined as a door locking operation that qualifies as cause for actuating a misplacement prevention alarm, and in a case in which the door locking operation received in step S104 is a door locking operation that qualifies as cause for actuating a misplacement prevention alarm, the CPU 21A transitions to step S108. Further, in a case in which a door locking operation received in step S104 is not a door locking operation that qualifies as cause for actuating a misplacement prevention alarm, the CPU 21A ends the misplacement prevention processing. For example, in a case of a door locking operation with respect to the physical key 50, a door locking operation with respect to the smartphone 14, or a door locking operation with a mechanical key incorporated in the physical key 50 that mechanically locks and unlocks the door locking device 28, the CPU 21A ends the misplacement prevention processing.

In step S108, the CPU 21A, functioning as the confirmation section 122, determines whether or not the smartphone 14 is inside the vehicle 12 based on the signal strength of the Bluetooth radio waves transmitted from the smartphone 14 to the vehicle 12. Specifically, in a case in which the signal strength of the Bluetooth radio waves transmitted from the smartphone 14 to the vehicle 12 is equal to or less than a threshold value, the smartphone 14 is determined to be outside the vehicle 12, and the CPU 21A transitions to step S114. Further, in a case in which the signal strength of the Bluetooth radio waves transmitted from the smartphone 14 to the vehicle 12 is larger than the threshold value, the smartphone 14 is determined to be inside the vehicle 12, and the processing transitions to step S110.

In step S110, the CPU 21A, functioning as the actuation section 126, requests that the control ECU 20 actuates an alarm by the alarm section 27. Moreover, the control ECU 20 effects control such that the alarm section 27 sounds a buzzer reporting misplacement of the smartphone 14.

In step S112, the CPU 21A requests unlocking by the door locking device 28. The door locking device 28 implements unlocking of the respective doors. Then, the CPU 21A transitions to step S120.

In step S114, the CPU 21A uses the BLE communication section 26 to transmit a locking completion notification to the smartphone 14.

Here, when the smartphone 14 receives the locking completion notification, the CPU 72 of the smartphone 14 executes an application program for vehicle control to perform the vibration information transmission processing illustrated in FIG. 8.

In step S130, the CPU 72 acquires vibration information, which is output from the vibration sensor 14D.

In step S132, the CPU 72 determines whether or not a predetermined period of time has elapsed since receiving the locking completion notification. In a case in which the predetermined period of time has not elapsed, the CPU 72 returns to step S130. Further, in a case in which the predetermined period of time has elapsed since receiving the locking completion notification, the CPU 72 transitions to step S134.

In step S134, the CPU 72 uses the BLE communication section 14C to transmit, to the vehicle 12, time-series data consisting of the vibration information acquired in step S130 within a predetermined period of time after receiving the locking completion notification, and the vibration information transmission processing is ended.

In step S116 in FIG. 6, the CPU 21A, functioning as the determination section 124, determines whether or not vibration of the smartphone 14 has been detected within a predetermined period of time after the door was locked, based on the time-series data for the vibration information received from the smartphone 14. For example, in a case in which the time-series data for the vibration information received from the smartphone 14 includes vibration information representing vibration of a certain magnitude or greater, it is determined that vibration of the smartphone 14 has been detected within a predetermined period of time after the door was locked, and the CPU 21A ends the misplacement prevention processing. Further, in a case in which the time-series data for the vibration information received from the smartphone 14 does not include vibration information representing vibration of a certain magnitude or greater, it is determined that vibration of the smartphone 14 has not been detected within a predetermined period of time after the door was locked, and the CPU 21A transitions to step S118.

In step S118, the CPU 21A, functioning as the actuation section 126, requests that the control ECU 20 actuates an alarm by the alarm section 27. Moreover, the control ECU 20 effects control such that the alarm section 27 sounds a buzzer reporting misplacement of the smartphone 14.

In step S120, the CPU 21A, functioning as the actuation section 126, determines whether or not a fixed time has elapsed since an alarm by the alarm section 27 was actuated, or whether or not an operation has been performed with respect to the physical key 50 or the smartphone 14. In a case in which a fixed time has elapsed since the alarm by the alarm section 27 was actuated or in which an operation has been performed with respect to the physical key 50 or the smartphone 14, the processing transitions to step S122.

In step S122, the CPU 21A, functioning as the actuation section 126, requests that the control ECU 20 stops the alarm by the alarm section 27. The control ECU 20 then effects control so as to stop the alarm by the alarm section 27. Then, the CPU 21A ends the misplacement prevention processing.

Figure 9:
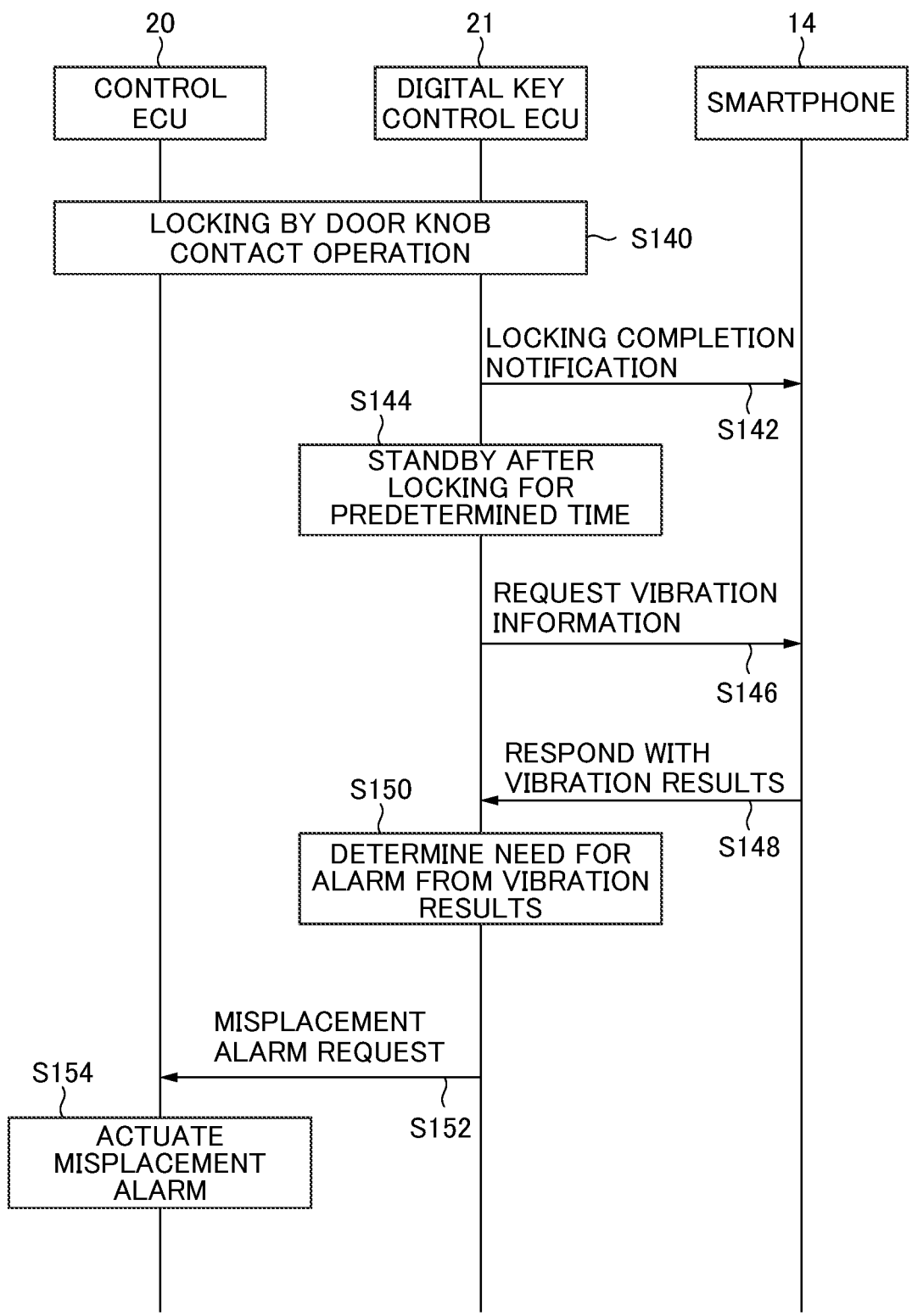
FIG. 9 is a sequence diagram illustrating an example of a flow of processing in a vehicle system of the first exemplary embodiment.

Next, explanation follows regarding an example of a flow of processing in a case in which the misplacement prevention processing and the vibration information transmission processing described above are executed, with reference to the sequence diagram of FIG. 9. Here, explanation follows of an example of a case in which a user disembarks from the vehicle 12, the user, holding the physical key 50, performs an operation of contacting the door knob 13, it is determined that the smartphone 14 is not inside the vehicle 12, and the smartphone 14 does not vibrate.

First, in step S140, the control ECU 20 and the digital key control ECU 21 execute door locking by the door locking device 28 in response to an operation in which a user holding the physical key 50 contacts the door knob 13.

Then, at step S142, the digital key control ECU 21 transmits a locking completion notification to the smartphone 14.

In step S144, the digital key control ECU 21 waits on stand-by for a predetermined period of time after the doors are locked.

In step S146, the digital key control ECU 21 requests vibration information from the smartphone 14.

In step S148, the smartphone 14 transmits time-series data of vibration information.

In step S150, the digital key control ECU 21 determines whether or not to actuate an alarm, based on the time-series data of the vibration information. Here, since there is no vibration of the smartphone 14, a determination is made to actuate the alarm.

In step S152, the digital key control ECU 21 requests that the control ECU 20 actuates an alarm by the alarm section 27.

In step S154, the control ECU 20 uses the alarm section 27 to effect control so as to sound a buzzer that reports misplacement of the smartphone 14.

Summary of the First Exemplary Embodiment

The vehicle 12 of the present exemplary embodiment is configured such that when the digital key control ECU 21 locks the vehicle doors, in a case in which it has not been confirmed that the smartphone 14 is inside the vehicle 12, and in a case in which vibration of the smartphone 14 is not detected within a predetermined period of time after the doors have been locked, an alarm is actuated. Even in a case in which it was not possible to confirm that the smartphone 14 with a registered digital key is inside the vehicle 12, in a case in which the smartphone 14 is thought to be misplaced, since the alarm is actuated, the user can be made aware of the misplacement.

Modified Example

Although explanation has been given regarding an example of a case in which an alarm is actuated in the vehicle 12 in order to make the user aware of misplacement of the smartphone 14, there is no limitation thereto. For example, the smartphone 14 may actuate an alarm to make the user aware of misplacement of the smartphone 14. In this case, the vehicle 12 may request the smartphone 14 to actuate an alarm, and the smartphone 14 may actuate the alarm using a speaker.

Further, although an example of a case in which it is determined whether or not vibration of the smartphone 14 has been detected within a predetermined period of time after the doors are locked has been described in the present exemplary embodiment, there is no limitation thereto. For example, it may be determined whether or not movement of the smartphone 14 has been detected within a predetermined period of time after the doors are locked. In this case, the movement of the smartphone 14 may be detected based on a change in the strength of radio waves transmitted from the smartphone 14 to the vehicle 12. For example, in a case in which the amount of change in the strength of radio waves transmitted from the smartphone 14 to the vehicle 12 within a predetermined period of time after the doors are locked is less than a threshold value, it is deemed that the smartphone 14 has been left behind. Further, in a case in which the amount of change in the strength of radio waves transmitted from the smartphone 14 to the vehicle 12 within a predetermined period of time after the doors are locked is equal to or greater than the threshold value, the smartphone 14 is deemed to be outside the vehicle 12.

Second Exemplary Embodiment

In the first exemplary embodiment, an onboard unit determines whether or not the smartphone is inside the vehicle, and actuates the alarm. In contrast, the second exemplary embodiment differs from the first exemplary embodiment in that the smartphone itself determines whether or not the smartphone is inside the vehicle, and actuates an alarm. Explanation follows regarding differences from the first exemplary embodiment. Here, the same reference numerals are assigned to the same constituent elements, and explanation thereof is omitted.

Overall Configuration

As illustrated in FIG. 1 described above, a vehicle system 210 according to the present exemplary embodiment includes a vehicle 12, a smartphone 214, and a physical key 50.

The digital key control ECU 21 of the onboard unit 11 installed in the vehicle 12 transmits a locking completion notification to the smartphone 214 at the time of locking the doors of the vehicle 12.

Specifically, when the doors are locked by an operation of contacting the door knob 13 by a user holding the physical key 50, the digital key control ECU 21 transmits a locking completion notification to the smartphone 214.

Smartphone

Figure 10:
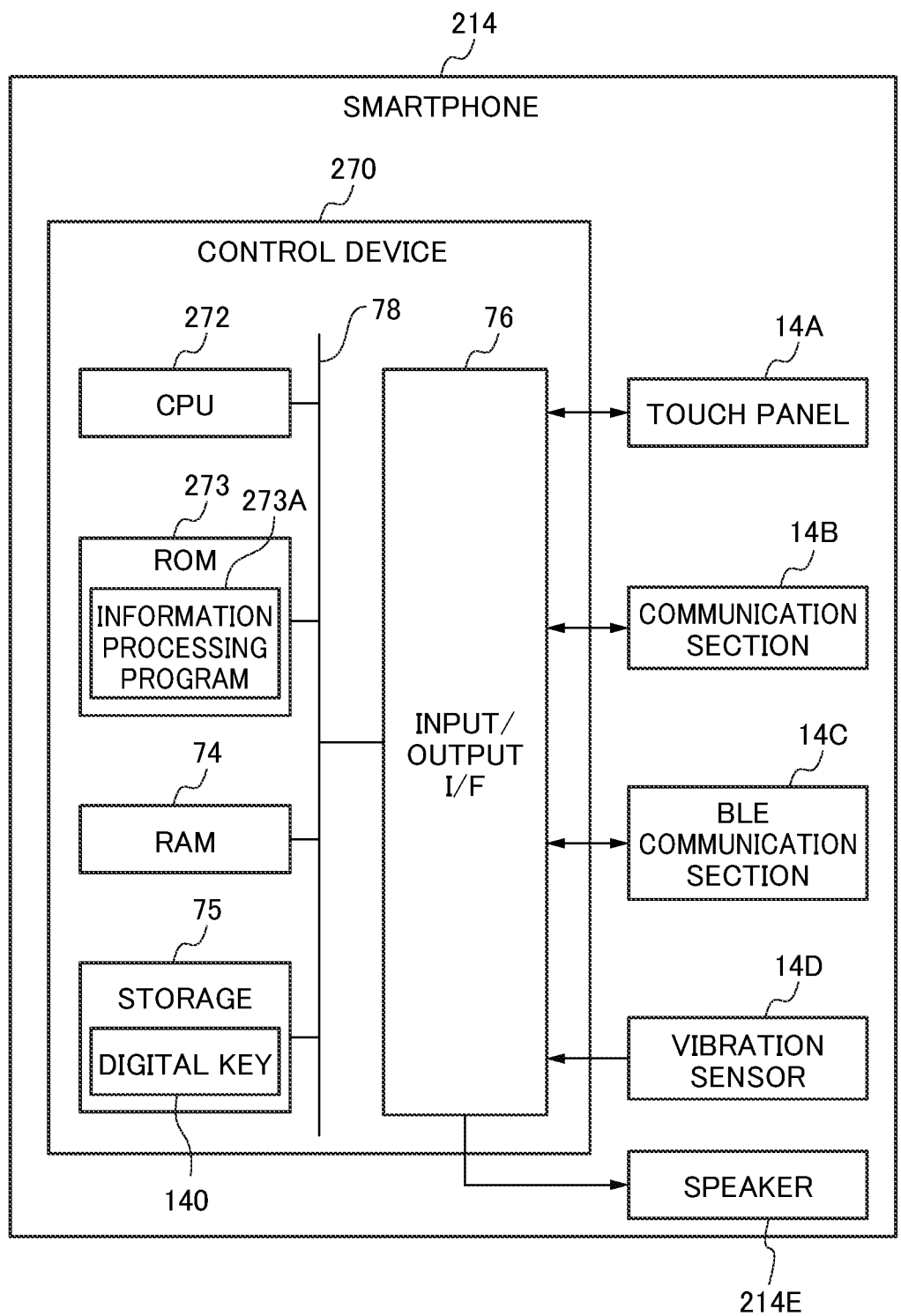
FIG. 10 is a block diagram illustrating a hardware configuration of a smartphone of the second exemplary embodiment.

As illustrated in FIG. 10, the smartphone 214 of the present exemplary embodiment includes a control device 270, a touch panel 14A, a communication section 14B, a BLE communication section 14C, a vibration sensor 14D, and a speaker 214E.

The control device 270 includes a CPU 272, which is an example of a processor configured by hardware, a ROM 273, a RAM 74, a storage 75, and an input/output I/F 76. The CPU 272, the ROM 273, the RAM 74, the storage 75, and the input/output I/F 76 are connected to each other via a bus 78.

The respective functionalities of the CPU 272, the ROM 273, the RAM 74, and the input/output I/F 76 are the same as those of the above-described CPU 20A, ROM 20B, RAM 20C, and input/output I/F 20D.

The CPU 272 reads an information processing program 273A from the ROM 273, and executes the information processing program 273A using the RAM 74 as a workspace. In the present exemplary embodiment, the information processing program 273A, which is an application program for performing vehicle control by means of a user operation using the digital key 140, is stored in the ROM 273.

Figure 11:
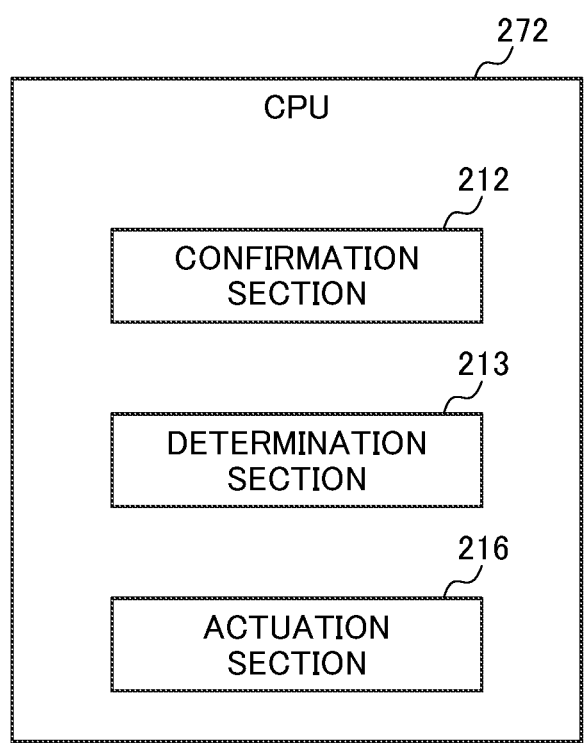
FIG. 11 is a block diagram illustrating an example of a functional configuration of a CPU of a control device in a smartphone of the second exemplary embodiment.

As illustrated in FIG. 11, the CPU 272 executes the information processing program 273A, thereby functioning as a confirmation section 212, a determination section 213, and an actuation section 216.

The confirmation section 212 confirms whether or not the smartphone 214 is inside the vehicle 12 at the time of locking the doors of the vehicle 12. More specifically, when a user holding the physical key 50 locks the doors by an operation of contacting the door knob 13, the confirmation section 122 determines whether or not the smartphone 214 is inside the vehicle 12 based on the signal strength of Bluetooth radio waves transmitted from the vehicle 12 to the smartphone 214.

In a case in which the confirmation section 212 has not confirmed that the smartphone 214 is inside the vehicle 12, the determination section 213 determines whether or not vibration of the smartphone 214 has been detected within a predetermined period of time after the doors have been locked. Specifically, in a case in which the confirmation section 122 has not confirmed that the smartphone 214 is inside the vehicle 12, the determination section 213 determines whether or not vibration of the smartphone 214 has been detected within the predetermined period of time from the locking of the doors based on vibration information representing vibration of the smartphone 214 within the predetermined period of time from the locking of the doors.

In a case in which the determination section 213 has not detected vibration of the smartphone 214, the actuation section 216 actuates an alarm using the speaker 214E. Moreover, in a case in which the confirmation section 212 has confirmed that the smartphone 214 is inside the vehicle 12, the actuation section 216 actuates an alarm using the speaker 214E. For example, the speaker 214E sounds a buzzer that informs the user that the smartphone 214 has been misplaced.

Processing Flow

Figure 12:
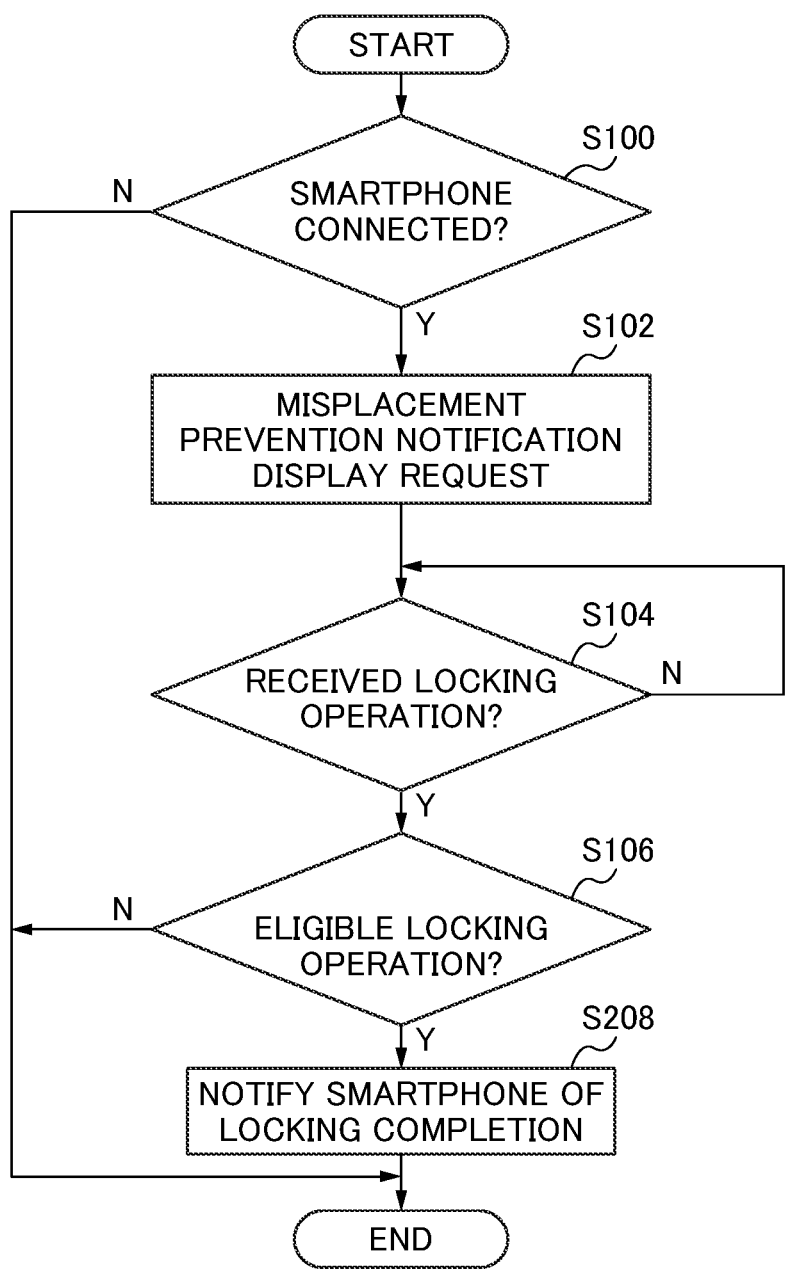
FIG. 12 is a flowchart illustrating an example of a flow of locking completion notification processing executed by a CPU of a digital key control ECU in an onboard unit of the second exemplary embodiment.
Figure 13:
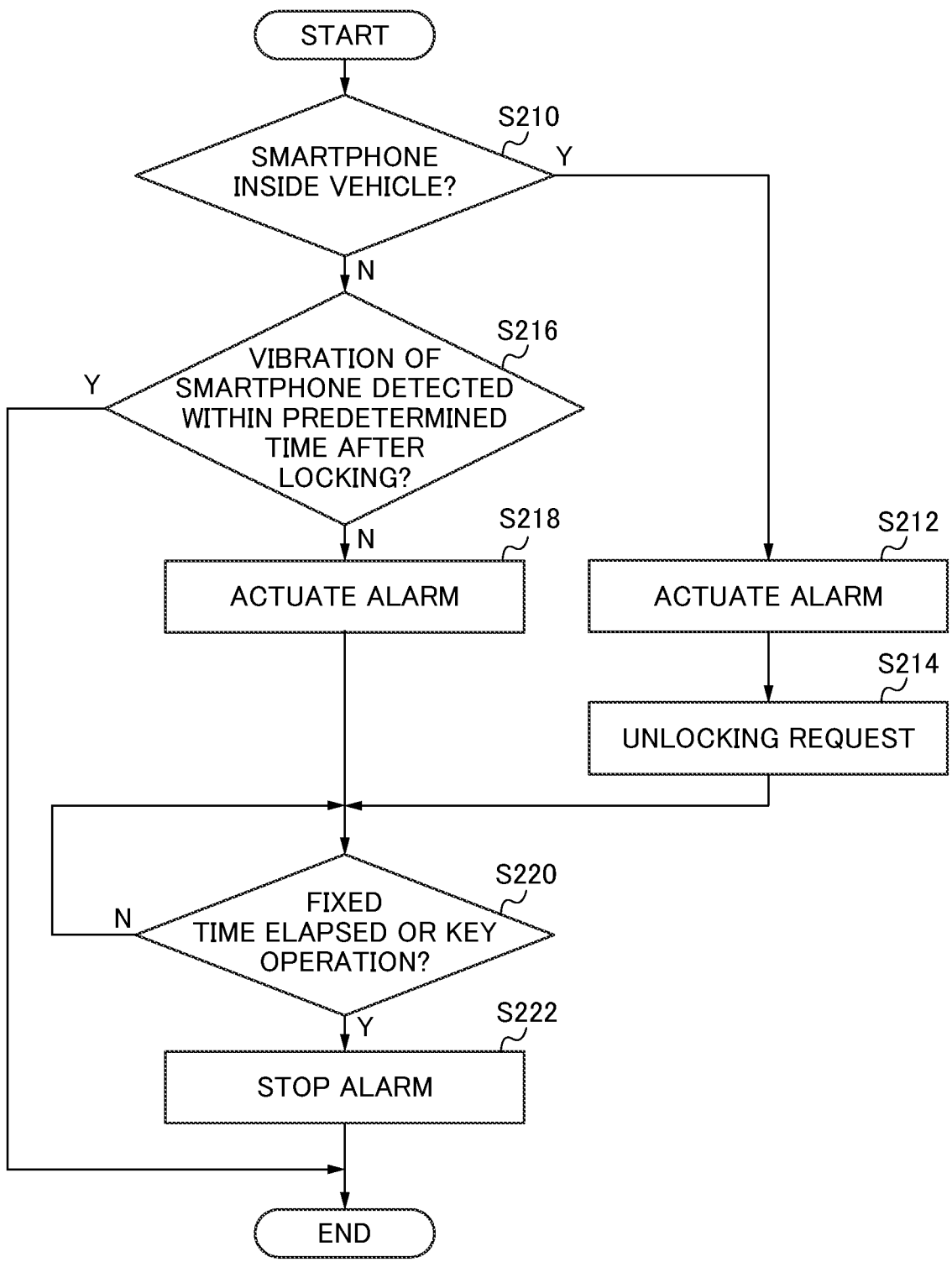
FIG. 13 is a flowchart illustrating an example of a flow of misplacement prevention processing executed by a CPU of a control device in a smartphone of the second exemplary embodiment.

Next, explanation is provided regarding a flow of processing in the vehicle system 210 of the present exemplary embodiment, with reference to the flowcharts of FIG. 12 and FIG. 13. Here, the same reference numerals are assigned to the same processing as in the first exemplary embodiment, and detailed explanation thereof is omitted.

First, when an operation by a user present inside the vehicle 12 to stop the engine is received, the CPU 21A of the digital key control ECU 21 of the onboard unit 11 executes a program to perform the locking completion notification processing illustrated in FIG. 12.

First, in step S100, the CPU 21A determines whether or not the BLE communication section 26 is connected by wireless communication using Bluetooth (registered trademark) to the BLE communication section 14C of the smartphone 214. In a case in which the BLE communication section 26 is not connected to the BLE communication section 14C of the smartphone 214, the CPU 21A ends the locking completion notification processing. In a case in which the BLE communication section 26 is connected to the BLE communication section 14C of the smartphone 214, the CPU 21A transitions to step S102.

In step S102, the CPU 21A requests that the control ECU 20 displays a notification to prevent the user from leaving behind the smartphone 214. Further, the control ECU 20 effects control such that the display section 25 displays a notification to prevent the user from leaving behind the smartphone 214. Here, the smartphone 214 may be requested to display a notification to prevent the user from leaving behind the smartphone 214, and the above-described message may be displayed at the touch panel 14 A of the smartphone 214.

At step S104, the CPU 21A determines whether or not a door locking operation by a user has been received. For example, when the user leaves the vehicle 12 and a locking operation of the doors, by operation of the user, using the smartphone 214 or the physical key 50 is received, the processing transitions to step S106. Further, the onboard unit 11 locks the respective doors using the door locking device 28.

At step S106, the CPU 21A determines whether or not the door locking operation received at step S104 is a door locking operation that qualifies as cause to actuate a misplacement prevention alarm.

Specifically, an operation in which a user holding the physical key 50 contacts the door knob 13 is defined as a door locking operation that qualifies as cause for actuating a misplacement prevention alarm, and in a case in which the door locking operation received at step S104 is a door locking operation that qualifies as cause for actuating a misplacement prevention alarm, the CPU 21A transitions to step S208. Further, in a case in which a door locking operation received in step S104 is not a door locking operation that qualifies as cause for actuating a misplacement prevention alarm, the CPU 21A ends the locking completion notification processing. For example, in a case of a door locking operation with respect to the physical key 50, a door locking operation with respect to the smartphone 214, or a door locking operation by a mechanical key incorporated in the physical key 50 that mechanically locks and unlocks the door locking device 28, the CPU 21A ends the locking completion notification processing.

In step S208, the CPU 21A uses the BLE communication section 26 to transmit a locking completion notification to the smartphone 214.

When the smartphone 214 receives the locking completion notification, the CPU 272 of the smartphone 214 executes an application program for vehicle control to thereby perform the misplacement prevention processing illustrated in FIG. 13.

First, in step S210, the CPU 272, functioning as the confirmation section 212, based on the signal strength of Bluetooth radio waves transmitted from the vehicle 12 to the smartphone 214, determines whether or not the smartphone 214 is inside the vehicle 12. Specifically, in a case in which the signal strength of Bluetooth radio waves transmitted from the vehicle 12 to the smartphone 214 is equal to or less than a threshold value, the CPU 272 determines that the smartphone 214 is outside the vehicle 12, and transitions to step S216. Further, in a case in which the signal strength of Bluetooth radio waves transmitted from the vehicle 12 to the smartphone 214 is larger than the threshold value, the smartphone 214 is determined to be inside the vehicle 12, and the processing transitions to step S212.

In step S212, the CPU 272, functioning as the actuation section 216, actuates an alarm using the speaker 214E. For example, the speaker 214E sounds a buzzer that informs the user that the smartphone 214 has been misplaced.

In step S214, the CPU 272 uses the BLE communication section 14C to request unlocking by the door locking device 28. The door locking device 28 implements unlocking of the respective doors. Then, the CPU 272 transitions to step S220.

In step S216, the CPU 272, until a predetermined period of time has elapsed since receiving the locking completion notice, acquires vibration information output from the vibration sensor 14D, and based on time-series data configured by the acquired vibration information, determines whether or not vibration of the smartphone 214 has been detected within a predetermined period of time after the doors have been locked. For example, in a case in which the time-series data of the acquired vibration information includes vibration information representing vibration of a certain magnitude or greater, it is determined that vibration of the smartphone 214 has been detected within a predetermined period of time after the doors have been locked, and the CPU 272 ends the misplacement prevention processing. Further, in a case in which the time-series data of the acquired vibration information does not include vibration information representing vibration of a certain magnitude or greater, it is determined that vibration of the smartphone 214 has not been detected within a predetermined period of time after the doors have been locked, and the CPU 272 transitions to step S218.

In step S218, the CPU 272, functioning as the actuation section 216, actuates an alarm using the speaker 214E, and sounds a buzzer to report that the smartphone 214 has been left behind.

In step S220, the CPU 272, functioning as the actuation section 216, determines whether or not a predetermined period of time has elapsed since the alarm using the speaker 214E was actuated, or whether or not an operation has been performed relative to the smartphone 214. In a case in which a predetermined period of time has elapsed since the alarm was actuated using the speaker 214E or in which an operation has been performed relative to the smartphone 214, the processing transitions to step S222.

In step S222, the CPU 272, functioning as the actuation section 216, stops the alarm that is using the speaker 214E. Then, the CPU 272 ends the misplacement prevention processing.

Figure 14:
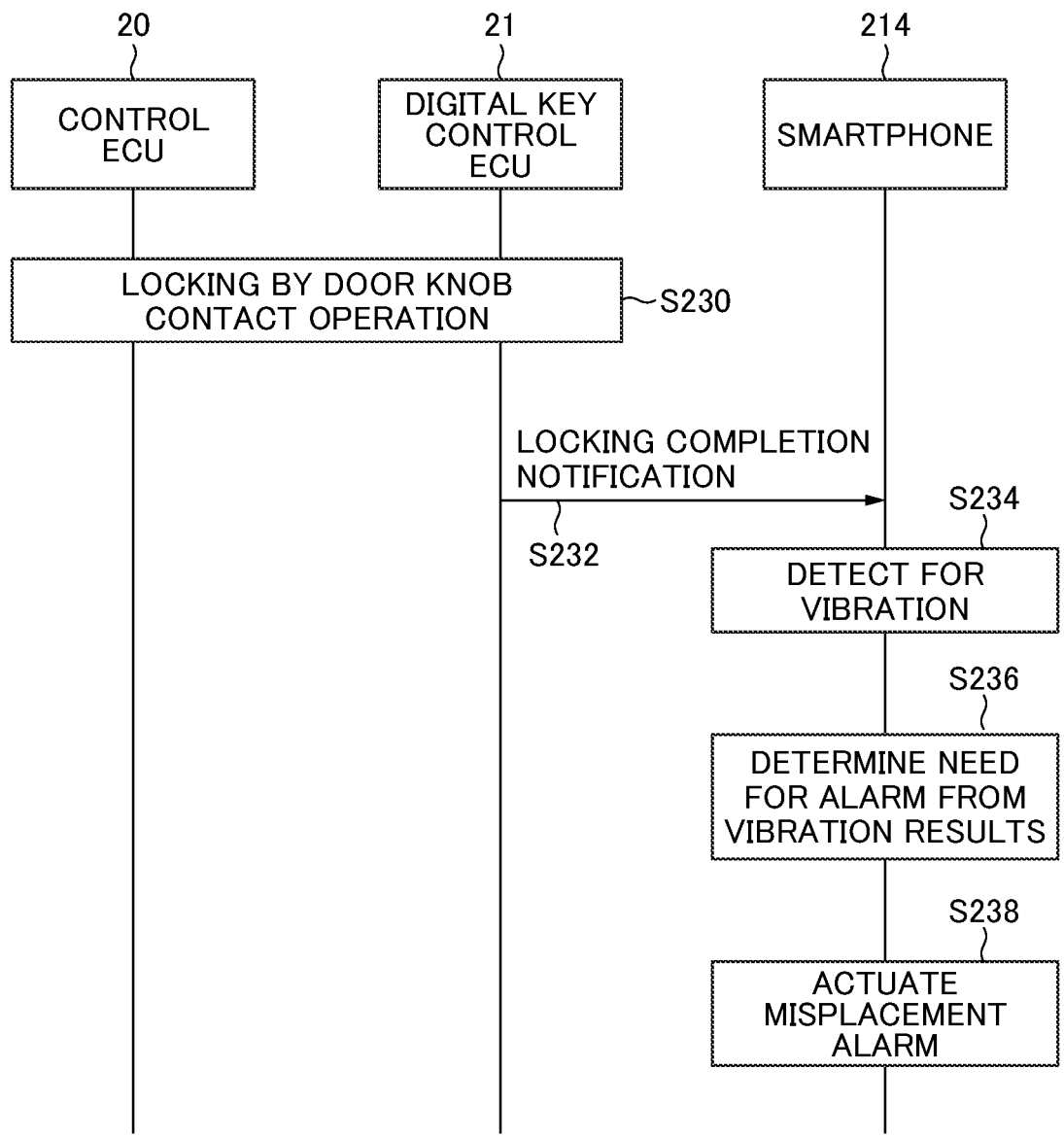
FIG. 14 is a sequence diagram illustrating an example of a flow of processing in a vehicle system of the second exemplary embodiment.

Next, explanation is provided regarding an example of a flow of processing in a case in which the locking completion notification processing and the misplacement prevention processing described above have been executed, with reference to the sequence diagram of FIG. 14. Explanation follows regarding an example of a case in which a user leaves the vehicle 12, an operation of contacting the door knob 13 is performed by the user holding the physical key 50, it is determined that the smartphone 214 is not inside the vehicle 12, and the smartphone 214 does not vibrate.

First, in step S230, the control ECU 20 and the digital key control ECU 21 execute door locking by the door locking device 28 in response to an operation in which a user holding the physical key 50 contacts the door knob 13.

In step S232, the digital key control ECU 21 transmits a locking completion notification to the smartphone 214.

In step S234, the smartphone 214 acquires vibration information until a predetermined period of time has elapsed since the doors were locked.

In step S236, based on the time-series data of the vibration information, the smartphone 214 determines whether or not to actuate an alarm. Here, since there is no vibration of the smartphone 214, the determination is made to actuate the alarm.

In step S238, the smartphone 214 actuates an alarm using the speaker 214E, and sounds a buzzer to report misplacement of the smartphone 214.

Summary of Second Exemplary Embodiment

The smartphone 214 of the present exemplary embodiment is configured such that when the control device 270 locks the vehicle doors, in a case in which the smartphone 214 is not confirmed to be inside the vehicle 12, if vibration of the smartphone 214 is not detected within a predetermined period of time after the doors have been locked, an alarm is actuated. As a result, even in a case in which it was not possible to confirm that the smartphone 214 with a digital key registered thereon was inside the vehicle 12, in a case in which it is deemed that the smartphone 214 has been left behind, since the alarm is actuated, the user can be made aware of the misplacement.

Modified Examples

Although an example of a case in which the smartphone 214 actuates an alarm to make the user aware of misplacement of the smartphone 214 has been described in the present exemplary embodiment, there is no limitation thereto. For example, the vehicle 12 may actuate an alarm to make the user aware of misplacement of the smartphone 214. In this case, the smartphone 214 may request that the vehicle 12 actuates an alarm, and the vehicle 12 may actuate an alarm generated by the alarm section 27. By actuating the alarm at the vehicle 12 side, the user can easily be made aware of misplacement as compared to a case in which the alarm is actuated at the smartphone 214 side.

Although an example of a case in which it is determined whether or not vibration of the smartphone 214 has been detected within a predetermined period of time after the doors have been locked has been described in the present exemplary embodiment, there is no limitation thereto. For example, it may be determined whether or not movement of the smartphone 214 has been detected within a predetermined period of time after the doors have been locked. In this case, the movement of the smartphone 214 may be detected based on a change in the intensity of radio waves transmitted from the vehicle 12 to the smartphone 214. For example, in a case in which the amount of change in radio wave intensity transmitted from the vehicle 12 to the smartphone 214 within a predetermined period of time after the doors have been locked is lower than a threshold value, it is deemed that the smartphone 214 has been left behind. Further, in a case in which the amount of change in the radio wave intensity transmitted from the vehicle 12 to the smartphone 214 within a predetermined period of time after the doors have been locked is equal to or greater than the threshold value, it is deemed that the smartphone 214 is outside the vehicle 12.

Notes

Although explanation has been given regarding an example of a case in which a buzzer is sounded as an alarm in the exemplary embodiments described above, there is no limitation thereto. An alarm using light, such as a hazard light, may be used to make the user aware of misplacement.

Although the information processing devices at which the digital key is registered are the smartphones 14, 214 in the respective exemplary embodiments described above, there is no limitation thereto, and the digital key 140 may be registered in a device with communication functionality, such as a tablet computer or a wearable computer.

Although explanation has been given regarding an example of a case in which the physical key 50 performs wireless communication with the onboard unit 11 in the LF band and the RF band in the respective exemplary embodiments described above, there is no limitation thereto. For example, the physical key 50 may perform wireless communication with the onboard unit 11 using Bluetooth (registered trademark), NFC, or Ultra Wide Band (UWB).

Although explanation has been given regarding an example of a case in which the smartphones 14, 214 perform wireless communication with the onboard unit 11 using Bluetooth (registered trademark), there is no limitation thereto. For example, the smartphones 14, 214 may perform wireless communication with the onboard unit 11 using NFC or UWB.

Although explanation has been given regarding an example of a case in which the vehicle 12 is a vehicle that operates and drives an engine using gasoline as power, there is no limitation thereto. The vehicle 12 may be an electric vehicle such as a hybrid electric vehicle (HEV), a plug-in hybrid electric vehicle (PHEV), a fuel cell electric vehicle (FCEV), or a battery electric vehicle (BEV).

The various processes executed by the CPUs 21A, 272 reading and executing software (programs) in the above-described exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The respective processing may be executed by any one of these various types of processor, or by a combination of two or more of the same type or different types of processor (such as plural FPGAs, or a combination of a CPU and an FPGA). The hardware configuration of these various types of processor is more specifically an electric circuit combining circuit elements such as semiconductor elements.

In the above-described exemplary embodiments, embodiments have been explained in which the respective programs are stored (installed) in advance in a non-transitory recording medium readable by a computer. For example, the information processing program 102 in the onboard unit 11 is stored in advance in the ROM 21B. Moreover, for example, the information processing program 273A in the smartphone 214 is stored in advance in the ROM 273. However, the respective programs are not limited thereto, and may be provided in a format recorded on a non-transitory recording medium such as compact disc read only memory (CD-ROM), digital versatile disc read only memory (DVD-ROM), or universal serial bus (USB) memory. Alternatively, the respective programs may be provided in a format downloadable from an external device over a network.

The flow of processing described in the foregoing exemplary embodiments is also an example, and unnecessary steps may be deleted, new steps may be added, or the processing order may be rearranged within a range not departing from the gist of the present invention.

In addition, the configurations of the onboard devices, the smartphones, the physical keys, and the management server described in the foregoing exemplary embodiments are examples, and may be modified according to circumstance within a range not departing from the gist of the present invention.

What is claimed is:

1. A vehicle, comprising:
    a memory; and
    a processor coupled to the memory, the processor being configured to:
    confirm, at a time of vehicle door locking, whether or not an information processing device configured to be used to perform the vehicle door locking, is inside the vehicle,
    in a case in which it has not been confirmed that the information processing device is inside the vehicle, determine whether or not vibration or movement of the information processing device has been detected within a predetermined period of time from the vehicle door locking, and
    in a case in which vibration or movement of the information processing device has not been detected, actuate an alarm.

2. The vehicle recited in claim 1, wherein the processor is configured to detect movement of the information processing device based on a change in intensity of a radio wave transmitted to the vehicle from the information processing device.

3. The vehicle recited in claim 1, wherein the processor is configured to determine whether or not the information processing device is inside the vehicle at a time of the vehicle door locking by an operation in which a user holding a physical key, which is used to perform the vehicle door locking, contacts a door knob.

4. An information processing device configured to be used to perform vehicle door locking, the information processing device comprising:
    a memory; and
    a processor coupled to the memory, the processor being configured to:
    confirm, at a time of the vehicle door locking, whether or not the information processing device is inside a vehicle,
    in a case in which it has not been confirmed that the information processing device is inside the vehicle, determine whether or not vibration or movement of the information processing device has been detected within a predetermined period of time from the vehicle door locking, and
    in a case in which vibration or movement of the information processing device has not been detected, actuate an alarm.

5. The information processing device recited in claim 4, wherein the processor is configured to cause the vehicle to actuate the alarm.

6. The information processing device recited in claim 4, wherein the processor is configured to determine whether or not the information processing device is inside the vehicle at a time of the vehicle door locking by an operation in which a user holding a physical key, which is used to perform the vehicle door locking, contacts a door knob.

7. An information processing method comprising, by a computer:
    confirming, at a time of vehicle door locking, whether or not an information processing device configured to be used to perform the vehicle door locking, is inside a vehicle;
    in a case in which it has not been confirmed that the information processing device is inside the vehicle, determining whether or not vibration or movement of the information processing device has been detected within a predetermined period of time from the vehicle door locking; and
    in a case in which vibration or movement of the information processing device has not been detected, actuating an alarm.

8. An information processing method in an information processing device configured to be used to perform vehicle door locking, the information processing device comprising a computer, the method comprising, by the computer:

confirming, at a time of the vehicle door locking, whether or not the information processing device is inside a vehicle;

in a case in which it has not been confirmed that the information processing device is inside the vehicle, determining whether or not vibration or movement of the information processing device has been detected within a predetermined period of time from the vehicle door locking; and in a case in which vibration or movement of the information processing device has not been detected, actuating an alarm.

9. A non-transitory recording medium storing a program that is executable by a computer to perform processing, the processing comprising:

confirming, at a time of vehicle door locking, whether or not an information processing device configured to be used to perform the vehicle door locking, is inside a vehicle;

in a case in which it has not been confirmed that the information processing device is inside the vehicle, determining whether or not vibration or movement of the information processing device has been detected within a predetermined period of time from the vehicle door locking; and in a case in which vibration or movement of the information processing device has not been detected, actuating an alarm.

10. A non-transitory recording medium storing a program that is executable by a computer to perform processing, the computer being provided at an information processing device configured to be used to perform vehicle door locking, the processing comprising:

confirming, at a time of the vehicle door locking, whether or not the information processing device is inside a vehicle;

in a case in which it has not been confirmed that the information processing device is inside the vehicle, determining whether or not vibration or movement of the information processing device has been detected within a predetermined period of time from the vehicle door locking; and in a case in which vibration or movement of the information processing device has not been detected, actuating an alarm.

\* \* \* \* \*